United States Patent
Rangole

(10) Patent No.: US 10,771,330 B1
(45) Date of Patent: *Sep. 8, 2020

(54) TUNABLE PARAMETER SETTINGS FOR A DISTRIBUTED APPLICATION

(71) Applicant: Amazon Technologies, Inc., Seattle, WA (US)

(72) Inventor: Ashish Rangole, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/684,416

(22) Filed: Aug. 23, 2017

Related U.S. Application Data

(63) Continuation of application No. 14/738,762, filed on Jun. 12, 2015, now Pat. No. 9,800,466.

(51) Int. Cl.
  *G06F 15/16* (2006.01)
  *H04L 12/24* (2006.01)
  *H04L 29/08* (2006.01)

(52) U.S. Cl.
  CPC .......... *H04L 41/0816* (2013.01); *H04L 67/10* (2013.01); *H04L 67/303* (2013.01)

(58) Field of Classification Search
  CPC .............................. H04L 67/10; H04L 43/12
  USPC ........................................ 709/225–226, 201
  See application file for complete search history.

(56) References Cited

U.S. PATENT DOCUMENTS

| | | | | |
|---|---|---|---|---|
| 9,058,189 | B1* | 6/2015 | Queru | G06F 9/445 |
| 9,800,466 | B1* | 10/2017 | Rangole | H04L 41/0823 |
| 2002/0129329 | A1* | 9/2002 | Nishioka | G06F 11/3476 717/104 |
| 2008/0027948 | A1* | 1/2008 | Corley | G06F 9/5083 |
| 2009/0210360 | A1* | 8/2009 | Sankar | G06F 9/44505 706/10 |
| 2011/0098973 | A1* | 4/2011 | Seidman | G06F 11/0709 702/179 |
| 2016/0170821 | A1* | 6/2016 | Shiralkar | G06F 11/0751 714/37 |

* cited by examiner

*Primary Examiner* — Duyen M Doan
(74) *Attorney, Agent, or Firm* — Thorpe North & Western, LLP.

(57) ABSTRACT

A technology is described for generating and modifying tunable parameter settings for use with a distributed application. An example method may include providing a first set of tunable parameter settings for a distributed application, where the first set of tunable parameter settings may be selected based at least in part on historical data associated with similar distributed applications. Performance metrics and implementation attributes associated with the distributed application may then be collected during a time period. The performance metrics and the implementation attributes collected may be input to a machine learning model configured to output a second set of tunable parameter settings for the distributed application, and the second set of tunable parameter settings may be provided for use with the distributed application, where performance of the distributed application may be better as compared to a performance using the first set of tunable parameter settings.

20 Claims, 7 Drawing Sheets

TUNABLE PARAMETER SETTINGS FOR A DISTRIBUTED APPLICATION

This application is a continuation of U.S. patent application Ser. No. 14/738,762, filed on Jun. 12, 2015, which is incorporated herein by reference.

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

A distributed application may be launched and executed within a computing service environment using a computing resource group that may be a configuration of computing resources (e.g., virtualized hardware and software) that form a private network environment. A distributed application may be software executed on or across multiple computing instances within a network. The software components executing on the computing instances may interact with one another in order to perform a data processing task. A distributed application may have tunable parameters that affect the operation of the distributed application. For example, a memory allocation parameter may be specified for a distributed application. A distributed application administrator may adjust the settings of the tunable parameters to increase, modify, and/or stabilize performance of a distributed application.

DETAILED DESCRIPTION

Figure 1:
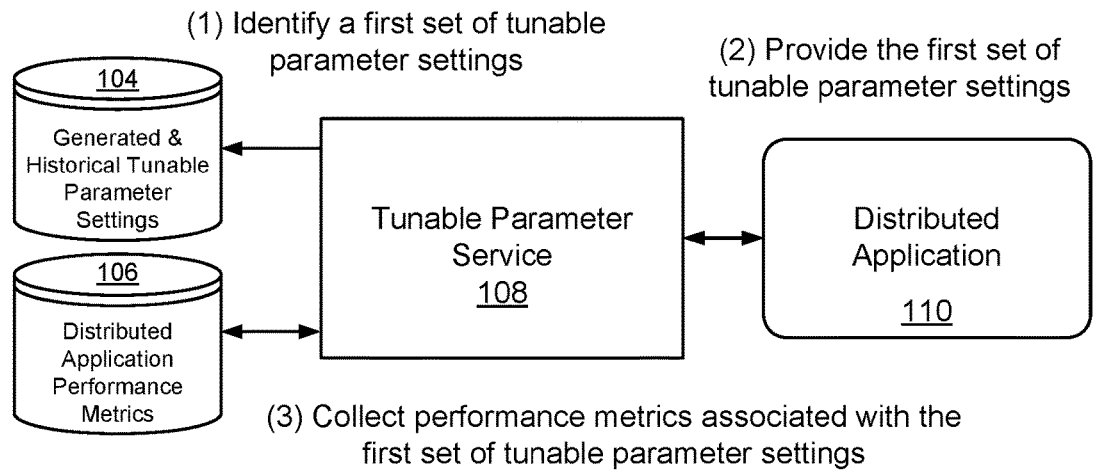
FIG. 1 is a diagram illustrating an example system and method for providing tunable parameter settings for use with a distributed application.
Figure 1:
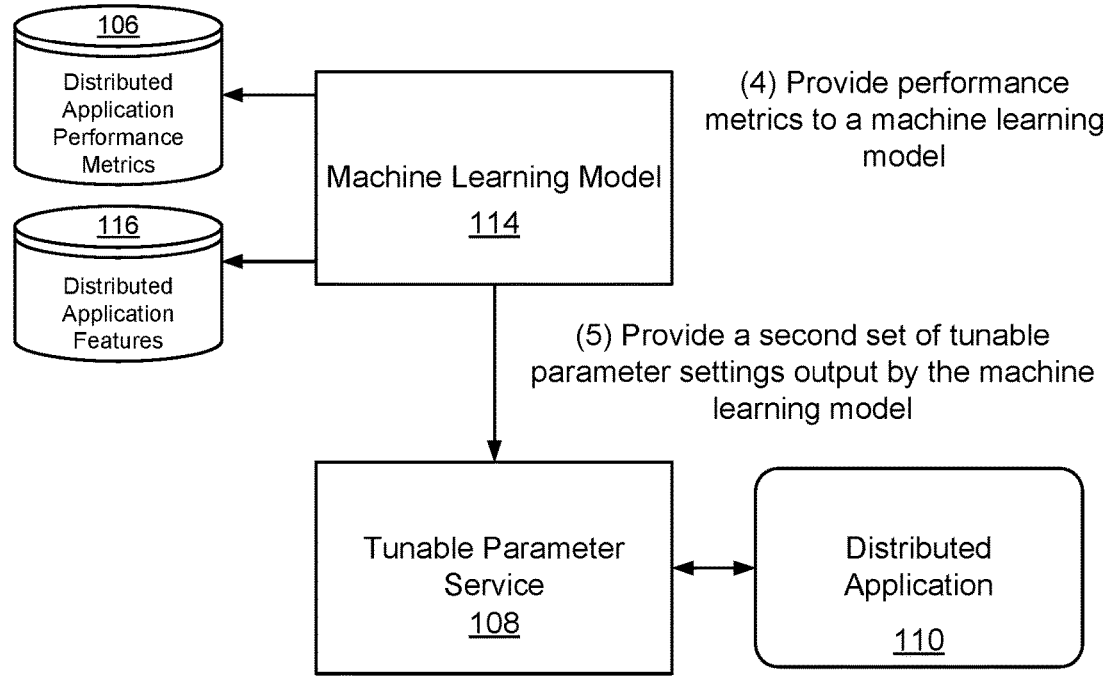

A technology is described for generating and modifying tunable parameter settings for a distributed application. In one example configuration, in response to a distributed application launch, a first set of tunable parameter settings may be identified for the distributed application, and the tunable parameter settings may be applied to the distributed application (e.g., tunable parameters for the distributed application may be set to the values of an initial set of tunable parameter settings that are believed to be valuable). Tunable parameter settings may be distributed application properties having values that when adjusted, potentially affect the performance of the distributed application.

In one example, a first set of tunable parameter settings may be selected based on historical data associated with similar distributed applications. For example, historical data associated with other implementations of the distributed application may be collected and the historical data may be used to identify an implementation of the distributed application that may be similar to the distributed application implementation being launched. Tunable parameter settings used for the similar distributed application implementation may be identified and the tunable parameter settings may be provided as the first set or initial set of tunable parameters.

During execution of the distributed application having the first set of tunable parameters applied to the distributed application, performance metrics and implementation attributes associated with the distributed application may be collected and stored. The performance metrics and implementation attributes may then be used to construct and train a machine learning model configured to output a set of generated tunable parameter settings for the distributed application that may be expected to result in an improved performance of the distributed application as compared to a performance using the first set or initial set of tunable parameter settings.

Features of a subsequent implementation of the distributed application may be input to the machine learning model producing a second set or subsequent set of generated tunable parameter settings. When applied to the distributed application, the second set of tunable parameter settings may result in an improved performance of the distributed application as compared to a performance using the first set of tunable parameter settings. As such, the second set of tunable parameter settings may be used to tune or fine tune the performance of the distributed application.

In the past, distributed application administrators have used a manual trial and error process to determine which tunable parameter settings are more useful for a particular data processing workload. As a result, excess resources (e.g., time and money) may be potentially expended in an effort to "dial-in" tunable parameter settings for a distributed application. The present technology may be used to provide a customer with tunable parameter settings that may be comparable to those tunable parameter settings that have been manually determined after using trial and error and significant resources. As such, the tunable parameter settings provided by the present technology, when applied to a distributed application may result in a better performance of the distributed application as compared to manually determining the tunable parameter settings.

FIG. 1 is a diagram illustrating a high level example of a system and method used to provide tunable parameter settings for a distributed application 110. Illustrated are a first implementation of the distributed application 102 and a second implementation of the distributed application 112 associated with a specific customer account. The first implementation of the distributed application 102 shows that a first set of tunable parameter settings may be provided as a result of the distributed application 110 being launched for a first time. The second implementation of the distributed application 112 shows that a second set of tunable parameters may be provided, where the second set of tunable parameters may be based on distributed application performance metrics 106 collected during the first implementation of the distributed application 102.

A distributed application 110 may be software, such as an open-source cluster computing framework that may be executed on multiple computing nodes (e.g., computing instances) in order to perform a data processing task. One example of a distributed application 110 may be a MapReduce application used to process and generate large data sets using a parallel, distributed process executing on a computing cluster (e.g., a computing instance group or computing resource group). Other distributed applications 110 having tunable parameters are also within the scope of this disclosure.

The tunable parameters of a distributed application 110 may be adjusted in order to increase the processing performance and/or stability of the distributed application 110. Examples of tunable parameters for a distributed application 110 may include computer memory size parameters, data structure parameters, data serialization parameters, memory recovery parameters, processor parameters, disk write parameters, network I/O (Input and Output) parameters, as well as other tunable parameters. Individually and collectively, settings for the tunable parameters may affect the performance of a distributed application 110. For example, setting a memory parameter to use too much computer memory may result in excessive garbage collection delays. Whereas, setting a memory parameter too low may result in excessive disk write operations. Further, various attributes of a system used to execute a distributed application 110 and the attributes of a data processing task may be additional factors in how well a distributed application 110 is able to perform a data processing task.

As illustrated, in implementing a distributed application 110 for a first time, a first set of tunable parameters may be identified and provided for the implementation of the distributed application 110. For example, instead of using default tunable parameter settings for the first time implementation of the distributed application 110, a customer may elect to use a first set of tunable parameter settings that may be configured for use with the specific implementation of the distributed application 110, and therefore may result in better performance of the distributed application 110 as compared to using default tunable parameter settings.

In one example configuration, because historical data may not exist for a first time implementation of a distributed application associated with a particular customer account, a tunable parameter service 108 may be configured to identify a first set of tunable parameter settings from a collection of historical tunable parameter settings 104 associated with the distributed application, similar distributed applications, and other customer accounts. In one example, historical tunable parameter settings 104 may be tunable parameter settings used in a past implementation of a distributed application associated with customers of a computing service provider. The historical tunable parameter settings 104 may be fine-tuned parameters, such that the tunable parameter settings may have been adjusted manually via trial and error to increase the processing performance of an associated distributed application implementation, and therefore may result in better performance when applied to the distributed application 110 as compared to applying default tunable parameter settings. The historical tunable parameter settings 104 may be stored along with attributes of the past implementation of the distributed application making the historical tunable parameter settings 104 searchable and available to customers to use in a first time distributed application implementation that may be similar to the past implementations of the distributed application.

The tunable parameter service 108 may be configured to identify a first set of tunable parameter settings from historical tunable parameter settings 104 by identifying implementation attributes for the distributed application 110 being launched and matching the implementation attributes with implementation attributes associated with the historical tunable parameter settings 104. In one example, implementation attributes may include distributed application attributes, computing resource attributes and processing task attributes. For example, distributed application attributes may include a distributed application implementation (APACHE HADOOP®, CouchDB, MONGODB®, etc.) and software version. Computing resource attributes may include attributes associated with a computing cluster used to execute a distributed application (e.g. number of cluster nodes or processor types). Processing task attributes may include attributes associated with a particular processing task performed using a distributed application (e.g., processing task problem or workload size).

In one example configuration, a similarity measure may be used to identify historical or generated tunable parameter settings 104. The similarity measure may compare implementation attributes for the distributed application 110 being launched with implementation attributes associated with the historical or generated tunable parameter settings 104. Historical tunable parameter settings 104 having implementation attributes that correspond to implementation attributes of the distributed application 110 being launched may be selected as a first set of tunable parameter settings because the similarity measure will be greater. The first set of tunable parameter settings selected using the similarity measure may, in one example, be automatically applied to the distributed application 110. In another example, the first set of tunable parameter settings may be recommended to a customer launching the distributed application 110, who may then manually apply the first set of tunable parameter settings to the distributed application 110.

In another example configuration, the tunable parameter service 108 may be configured to generate generated tunable parameter settings that may be used as a first set of tunable parameter settings. Generated tunable parameter settings may be tunable parameter settings generated by a machine learning model using attributes associated with past implementations of a distributed application associated with customers of a computing service provider. More specifically, metrics and attributes for past implementations of a distributed application (e.g., instances of the distributed application 110 implemented using various computing resource configurations and user data configurations) associated with various customers may be collected, and the metrics and attributes may be input to a machine learning model that outputs generated tunable parameter settings that may be expected to result in better performance of the distributed application 110 as compared to using default tunable parameter settings. Generated tunable parameter settings are described in further detail below in relation to FIG. 4.

In another example, where historical data associated with a past implementation of the distributed application for a customer may exist, but not enough historical data exists to generate tunable parameter settings using a machine learning model 114, a first set of tunable parameter settings may be determined using the historical data associated with the prior instance of the distributed application. For example, the tunable parameter settings used for the past implementation of the distributed application may be identified and used as a first set of tunable parameter settings when the data processing task of the past implementation may be identical to the data processing of the current implementation, and the customer associated with both distributed application implementations are the same.

Performance metrics 106 associated with executing a first implementation of the distributed application 110 using a first set of tunable parameter settings may be collected during execution of the distributed application 110 and stored so that the performance metrics 106 may be used in determining a second set of tunable parameter settings that may be provided in association with a second implementation of the distributed application 112. The performance metrics 106 may represent the metrics of computing resources (e.g., a computing cluster) used to execute and support the distributed application 110. Example performance metrics 106 may include metrics for: processors, computer memory, network, I/O (Input and Output), data stores, processing calls, data ingestion, data connectivity, data serialization, parallelism, workflow coordination, processing times, I/O times, or any other quantity that may be used to describe the metrics of computing resources and/or execution of a data processing task.

Associated with a second implementation of the distributed application 112, a feature vector may be constructed for use with a machine learning model 114 and the feature vector may use distributed application features 116 selected from tunable parameter settings, distributed application attributes, and computing resource attributes, as well as the distributed application performance metrics 106 collected during the first implementation of the distributed application 102. In one example, tunable parameter settings that may have been determined to have a greater impact on a performance of the distributed application 110 as compared to other tunable parameter settings for the distributed application may be selected for inclusion in the feature vector. For example, analysis over a time period may show that some tunable parameter settings influence the performance of a distributed application 110 significantly, whereas other tunable parameter settings may have little impact on the performance of the distributed application 110. In some examples, due to a large number of performance metrics 106 that may be collected (e.g., hundreds or thousands of metrics may be collected), and the large number of features that may be extracted from the performance metrics 106, the features may be condensed to a smaller number of features (e.g., via classification).

The feature vector may then be provided to a machine learning model 114 that may be configured to output a second set of tunable parameter settings for the distributed application 110 that may result in an improved performance as compared to a performance using the first set of tunable parameter settings. For example, given a set of tunable parameters for a distributed application 110, the machine learning model 114 may output generated tunable parameter settings according to the features included in the feature vector. The generated tunable parameter settings may be predictions based on probabilities that the tunable parameter settings will result in an improved performance of the distributed application 110 as compared to a performance using the first set of tunable parameter settings. Examples of machine learning models that may be used include a linear regression model, a random forest model, a decision trees model, a Bayesian model, a naive Bayes model, a probabilistic graphical model, as well as other machine learning models not specifically mentioned here.

In one example, the second set of tunable parameter settings generated using the machine learning model 114 for the distributed application 110 may be recommended to a customer. For example, a notification may be provided to a customer advising the customer of the second set of tunable parameter settings. The notification may allow the customer (e.g., via a control or link included in the notification) to accept the recommended second set of tunable parameter settings, wherein the second set of tunable parameter settings may be applied to the distributed application 110 as a result of the customer accepting the recommended second set of tunable parameter settings. In another example, the second set of tunable parameter settings may be immediately applied without customer or user intervention when the second implementation of the distributed application 112 is launched.

Applying the second set of tunable parameter settings may result in an improved performance of the distributed application 110. As an illustration, APACHE SPARK™ is a distributed application that utilizes tunable parameters for data processing tasks. APACHE SPARK™ is configured to perform computations by holding data sets in memory as opposed to retrieving the data sets from storage. Due to the in-memory nature of APACHE SPARK™, cluster resources (e.g., processors, network bandwidth, or computer memory) can become bottlenecked. Adjusting tunable parameters via settings generated by the machine learning model 114 may reduce bottlenecks. Illustratively, a memory parameter setting provided in a first set of tunable parameter settings may be set to 32 GB, which may result in an "out of memory error" because a data set did not fit in memory. A memory parameter setting provided in a second set of tunable parameter settings may be set at 64 GB, increasing the amount of memory allocated for the data set. As a result, the "out of memory error" may not occur during a second implementation of the distributed application 110.

With each implementation of the distributed application in which the data processing task is executed (e.g., third, fourth, fifth implementations and so on), performance metrics 106 for the implementation may be collected and the performance metrics 106 may be used in generating a set of tunable parameter settings for a subsequent distributed application implementation, forming a feedback loop. As such, an accumulation of performance metrics 106 may be collected over time allowing for fine tuning of the tunable parameter settings, and therefore resulting in improved performance of the distributed application 110 over time.

Figure 2:
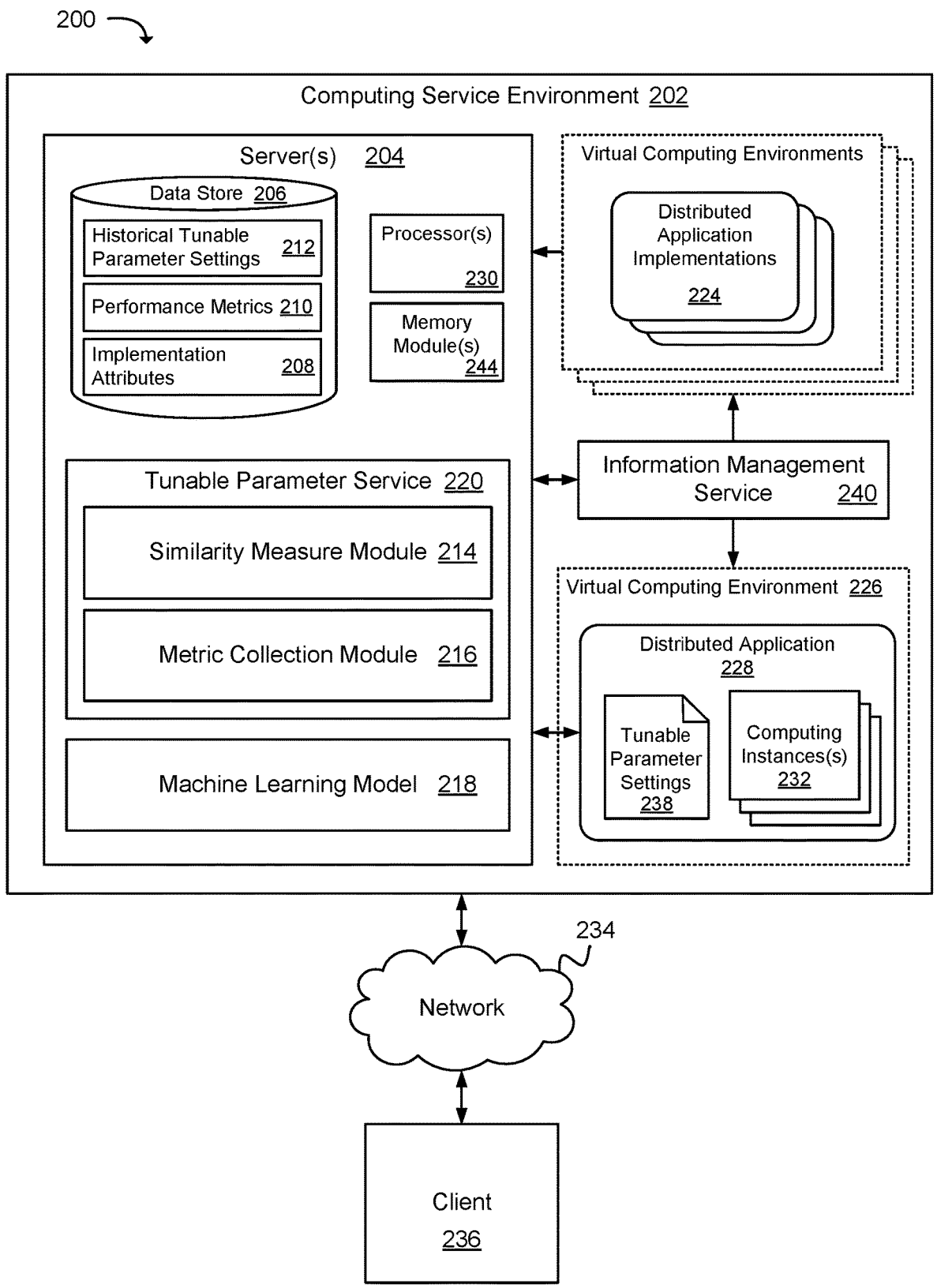
FIG. 2 is a block diagram that illustrates various example components included in a system for providing tunable parameter settings for use with a distributed application.

FIG. 2 illustrates components of an example system 200 on which the present technology may be executed. The system 200 may include a computing service environment 202 that may provide computing, storage and networking capacity as a software service to a number of customers. Computing resources within the computing service environment 202 may be securely shared by multiple customers. In one example, a virtual computing environment 226 may be established for a customer providing the customer with a "private cloud environment" that may be used to execute a customer's software solutions. For example, a virtual computing environment 226 may allow for the installation and execution of a distributed application 228 using a plurality of computing instances 232 included within the virtual computing environment 226.

A distributed application 228 may have tunable parameter settings 238 specifying various properties of the distributed application 228 (e.g., computer memory size properties, data structure properties, data serialization properties, memory recovery properties, and the like). The tunable parameter settings 238 may be adjusted according to computing resources used to execute the distributed application 228 and a data processing task executed by the distributed application 228.

Also included within the computing service environment 202 may be one or more servers 204 having services configured to provide a tunable parameter service 220 capable of providing tunable parameter settings for a distributed application implementation. As illustrated, the server 204 may include a tunable parameter service 220 containing a similarity measure module 214, a metric collection module 216, and a machine learning model 218.

The similarity measure module 214 may be configured to identify tunable parameter settings for a distributed application 228 from a collection of historical tunable parameter settings 212 in response to a first time launch of a distributed application 228. More specifically, as a result of a customer launching a distributed application 228 to execute a particular data processing task for a first time, a first set of tunable parameter settings associated with similar historical data processing tasks executed using the distributed application 228 may be identified and recommended to the customer. The historical data processing tasks may be associated with the customer, or may be associated with other customers of a computing service provider.

A first set of tunable parameter settings may be provided to a customer for a first time implementation of a distributed application 228. The first set of tunable parameter settings may be identified using implementation attributes of the distributed application 228 (e.g., distributed application attributes, computing resource attributes and data processing task attributes). For example, a collection of historical tunable parameter settings 212 may include implementation attributes 208 associated with past distributed application implementations 224, such as distributed application attributes, computing resource attributes and data processing task attributes. Accordingly, implementation attributes for the distributed application 228 being launched may be used to identify historical tunable parameter settings 212 having similar implementation attributes 208. As an illustration, implementation attributes of a distributed application launch may include a distributed application type and version, a computing cluster architecture, and data processing task details. Historical tunable parameter settings 212 may be queried using the above implementation attributes to identify historical tunable parameter settings 212 that have similar implementation attributes 208.

A first set of tunable parameter settings may be provided to the tunable parameter service 220, which may be configured, in one example, to provide the first set of tunable parameter settings to a customer, who then may choose to have the first set of tunable parameter settings applied to the distributed application 228. In another example, the tunable parameter service 220 may be configured to automatically apply the first set of tunable parameter settings to the distributed application 228.

The metric collection module 216 may be configured to collect performance metrics 210 associated with executing a data processing task using the distributed application 228.

For example, after providing a first set of tunable parameter settings for a distributed application 228, performance metrics 210 associated with executing a data processing task using the distributed application 228 having the first set of tunable parameter settings applied may be collected. In one example, external tools that monitor various aspects of a virtual computing environment 226 (or computing service environment 202) may be queried via an information management service 240 to obtain performance metrics 210 associated with various computing resources included in the virtual computing environment 226 (e.g., hypervisor metrics, processing metrics, computer memory metrics, network throughput metrics, storage metrics, etc.). Alternatively or in addition, performance metrics 210 may be received from software agents included in computing instances 232 used to execute a distributed application 228 as is discussed in relation to FIG. 5. A software agent may be configured to report performance metrics 210 to the metric collection module 216. Performance metrics 210 and implementation attributes associated with the distributed application 228 may be collected during a time period in which the distributed application 228 is executing a data processing task.

In the event that the distributed application 228 is again launched to execute the data processing task, a second set of tunable parameter settings may be provided to the customer, such that the second set of tunable parameter settings may be expected to improve the distributed application's ability to execute the data processing task. In one example configuration, the machine learning model 218 may be used to generate a second set of tunable parameter settings. For example, a feature vector may be constructed using the performance metrics 210 collected using the metric collection module 216 and implementation attributes 208 associated with the performance metrics 210. A resulting feature vector may then be provided to the machine learning model 218 which may be configured to output the second set of tunable parameter settings for the distributed application 228 that result in an improved performance as compared to a performance using the first set of tunable parameter settings. Illustratively, the machine learning model 218 may determine tunable parameter settings by evaluating the performance metrics 210 and implementation attributes 208 included in the feature vector to identify tunable parameters settings that potentially result in better performance of the distributed application over the first set of tunable parameter settings.

The second set of tunable parameter settings may be provided to the tunable parameter service 220 and the customer, who may choose to have the second set of tunable parameter settings applied to the distributed application 228. Or, as described above, the second set of tunable parameter settings may be automatically applied to the distributed application 228 without customer intervention.

The process of collecting performance metrics 210 using the metric collection module 216 may again be performed during the execution of the data processing task with the second set of tunable parameter settings applied to the distributed application 228. As the customer launches the distributed application 228 additional times to execute the data processing task, additional sets of tunable parameter settings may be periodically provided to the customer, such that the tunable parameter settings may be expected to improve the distributed application's ability to execute the data processing task over previous launches of the distributed application 228.

In cases where a customer may execute a distributed application 228 using default tunable parameter settings, or where a first set of tunable parameter settings may not be provided due to an inability to identify generated or historical tunable parameter settings 212 for a distributed application implementation, tunable parameter settings for the distributed application 228 may be adjusted by randomized increments or may be adjusted using heuristics. The resulting performance metrics 210 associated with executing the distributed application 228 using the adjusted tunable parameter settings may be collected during an adjustment time period (e.g., a period of time between adjustments of the tunable parameter settings using randomized increments or heuristics). Consequently, by adjusting the tunable parameters, the performance metrics 210 collected may be dissimilar, and as such, when the performance metrics 210 are provided to the machine learning model 218, a comparison of the performance metrics 210 may result in predictions based on probabilities that the tunable parameter settings output by the machine learning model 218 may result in an improved performance of the distributed application 110 when applied to the distributed application 110.

A client 236 may be used to provide a customer access to a customer's virtual computing environment 226 and to provide the customer with recommended tunable parameter settings. A client 236 may be a networked application (e.g., web app) executing using a server, or may be a client device that may include any device capable of sending and receiving data over a network 234. A client device may comprise, for example a processor-based system such as a computing device. A client device may be a device such as, but not limited to, a desktop computer, laptop or notebook computer, tablet computer, mainframe computer system, handheld computer, workstation, network computer, or other devices with like capability.

The various processes and/or other functionality contained within the system 200 may be executed on one or more processors 230 that are in communication with one or more memory modules 244. The system 200 may include a number of computing devices that are arranged, for example, in one or more server banks or computer banks or other arrangements. The computing devices may support a computing environment using hypervisors, virtual machine monitors (VMMs) and other virtualization software.

A data store 206 may be used to store implementation attributes 208, historical tunable parameter settings 212, performance metrics 210 and other data utilized within the system 200. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 234 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain computing services may be discussed in connection with this technology and these computing services may be implemented as processing modules. In one example configuration, a service may have one or more processes executing on a server or other computer hardware. Such services may be centrally hosted functionality or a service application that may receive requests and provide output to other services or consumer devices. For example, computing services may be considered on-demand computing that are hosted in a server, virtualized service environment, grid or cluster computing system. An API (Application Programming Interface) may be provided for each service to enable a second service or module to send requests to and receive output from the first service. Such APIs may also allow third parties to interface with the service and make requests and receive output from the services. While FIG. 2 illustrates an example of a system that may implement the techniques above, many other similar or different environments are possible. The example environments discussed and illustrated above are merely representative and not limiting.

Figure 3:
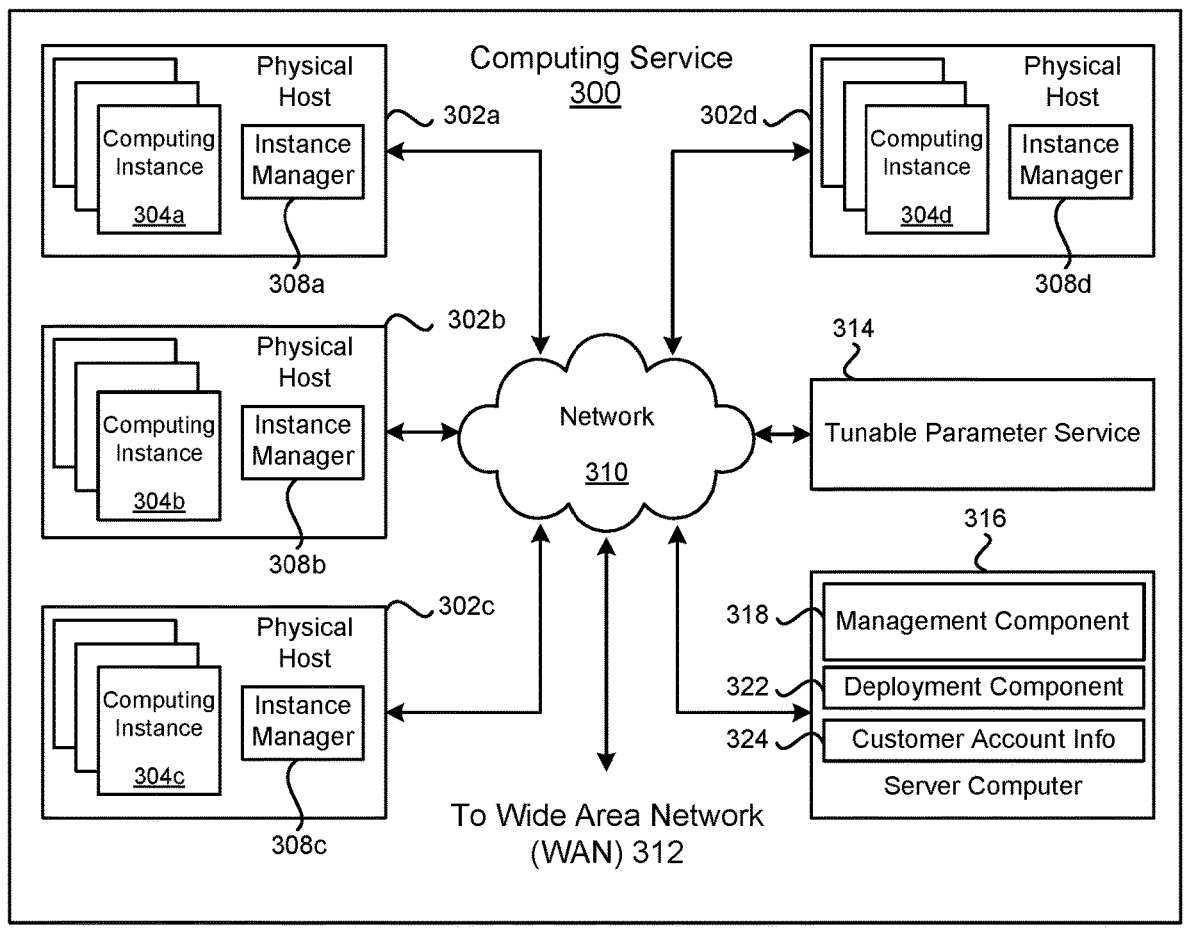
FIG. 3 is a block diagram that illustrates an example computing service environment that includes a tunable parameter service.

FIG. 3 is a block diagram illustrating an example computing service 300 that may be used to execute and manage a number of computing instances 304a-d used to execute a distributed application performing a data processing task. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a tunable parameter service that may perform the functions described earlier, such as providing customers with tunable parameter settings that may result in an improved performance of a distributed application to execute a data processing task.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
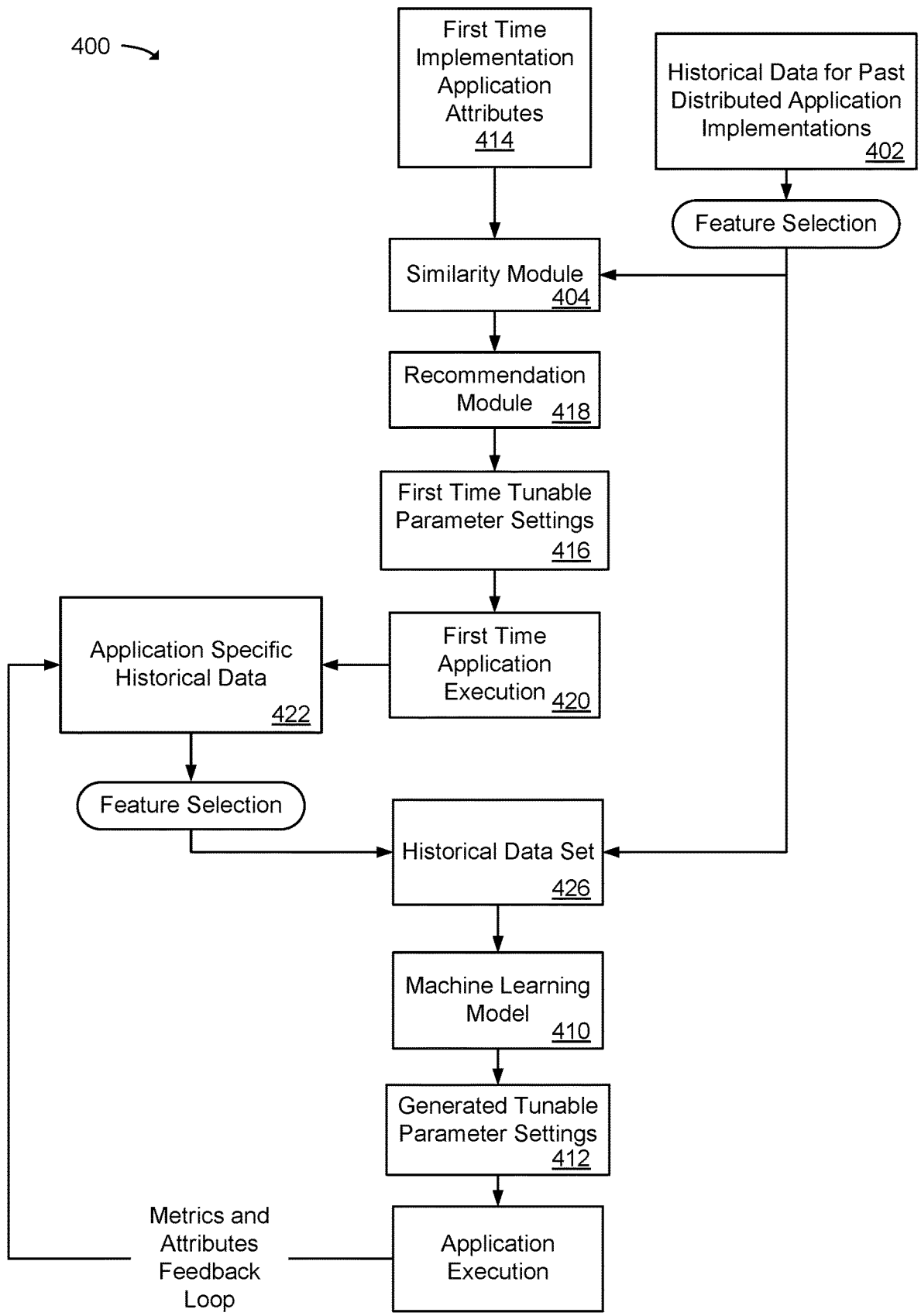
FIG. 4 is a block diagram illustrating an example system for determining generated tunable parameter settings for a first implementation of a distributed application using a machine learning model.

Moving now to FIG. 4, a block diagram illustrates an example system and method 400 for determining first time tunable parameter settings 416 and generated tunable parameter settings 412 that may be provided for an implementation of a distributed application on behalf of a customer. The first time tunable parameter settings 416 and the generated tunable parameter settings 412 may be expected to result in better performance of a distributed application as compared to using default tunable parameter settings. As illustrated, first time tunable parameter settings 416 for a first time implementation of a distributed application may be determined using features of historical data 402 associated with past distributed application implementations and/or first time implementation application attributes 414 of the distributed application.

In one example, the features of the historical data 402 may be selected from tunable parameter attributes, distributed application attributes, and computing resource attributes that may be obtained from various sources and may include performance metrics for the past distributed application implementations. The historical data 402 may be associated with a defined implementation of a distributed application. The distributed application implementation may be executed on behalf of any customer of a computing service provider. The historical data 402 may be collected along with other performance metrics and implementation attributes associated with other implementations of the distributed application.

A similarity module 404 may be used to compare the first time implementation application attributes 414 with the features of the historical data 402 to identify first time tunable parameter settings 416 that may be used in a first time execution of the distributed application. A recommendation module 418 may then be used to recommend the first time tunable parameter settings 416 to a customer associated with the distributed application. The customer may apply the first time tunable parameter settings 416 to the distributed application and the distributed application may be executed for a first time 420.

During the first time execution of the distributed application 420, application specific historical data 422 may be collected. For example, tunable parameter attributes, distributed application attributes, and computing resource attributes may be collected during the execution of the distributed application. The application specific historical data 422 may be used in combination with the historical data 402 for past distributed application implementations to form a training data set (historical data set 426) used to train a machine learning model 410. Examples of machine learning models that may be used include a linear regression model, a random forest model, a decision trees model, a Bayesian model, a naive Bayes model, a probabilistic graphical model, or other machine learning model.

Having trained the machine learning model 410, features for subsequent implementations of the distributed application may be selected and used to construct feature vectors that are input to the machine learning model 410. The machine learning model 410 may be configured to evaluate the features and output generated tunable parameter settings 412 that may be applied to the distributed application.

As an illustration, in the case of a linear regression model, generated tunable parameter settings 412 may be generated based on probabilities that the generated tunable parameter settings may result in a performance of a current distributed application implementation that may be similar to that of past distributed application implementations that provided the training data used to train the linear regression model.

The generated tunable parameter settings 412 output by the machine learning model 410 may be provided to a customer for use in a current implementation of the distributed application. As described earlier, performance metrics may be collected for the first implementation of the distributed application and the performance metrics may be evaluated to produce a subsequent sets of tunable parameter settings that may be specific to the customer's implementation of the distributed application, and therefore when applied, may result in better performance of the distributed application over prior sets of tunable parameter settings.

Figure 5:
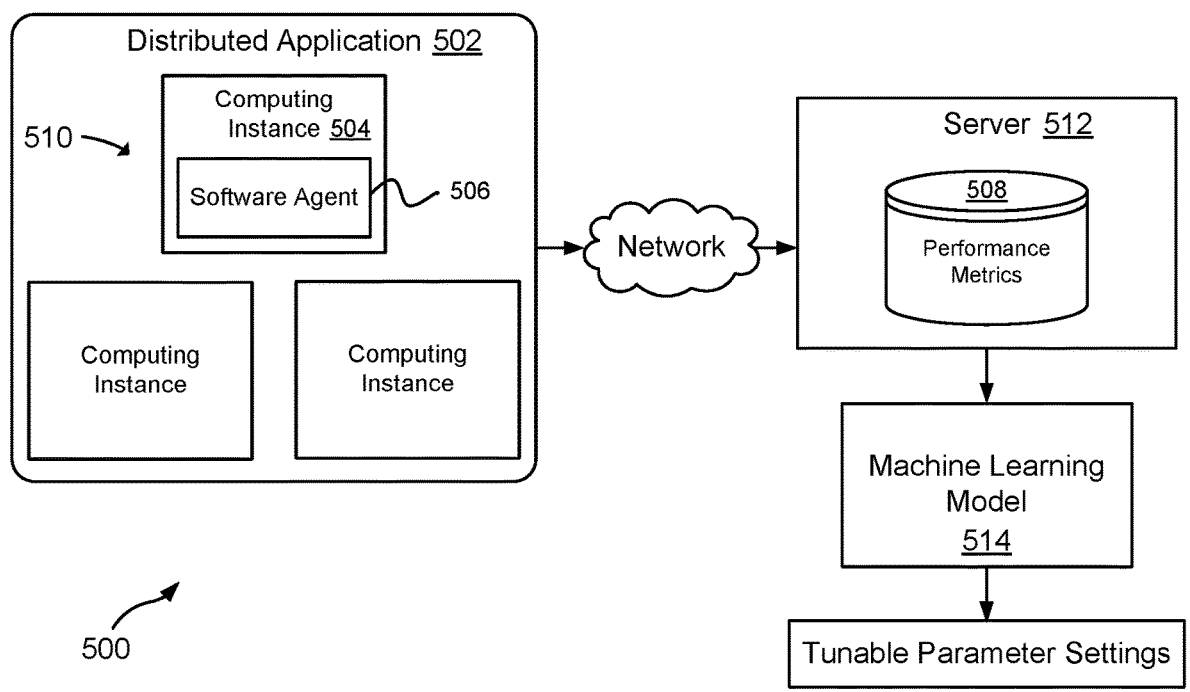
FIG. 5 is a block diagram illustrating and example system used to collect performance metrics for a specific implementation of a distributed application.

FIG. 5 is a block diagram illustrating an example system 500 used to collect performance metrics 508 for a specific implementation of a distributed application 502. As illustrated, a distributed application 502 may be executed using a computing cluster comprising a plurality of computing instances 510. A software agent 506 or daemon may be installed on one or more of the computing instances 510 (e.g., on a primary computing instance 504) and the software agent 506 may be configured to report performance metrics 508 to a server 512. For example, software agents 506 executing on computing instances 510 may monitor resources used by the distributed application 502 and report back to the server 512 that may manage a record of performance metrics 508. The performance metrics 508 may be used in determining a set of tunable parameter settings using a machine learning model 514 that may be applied to the distributed application 502 resulting in better performance of the distributed application as compared to a prior set of tunable parameter settings.

In one example, collecting performance metrics 508 and implementation attributes associated with a distributed application 502 may be accomplished via an API that may be used to write the performance metrics and the implementation attributes out to a distributed application log. For example, a software agent 506 may utilize the API to write out performance metrics 508 and implementation attributes of a computing instance 504 to a distributed application log.

Figure 6:
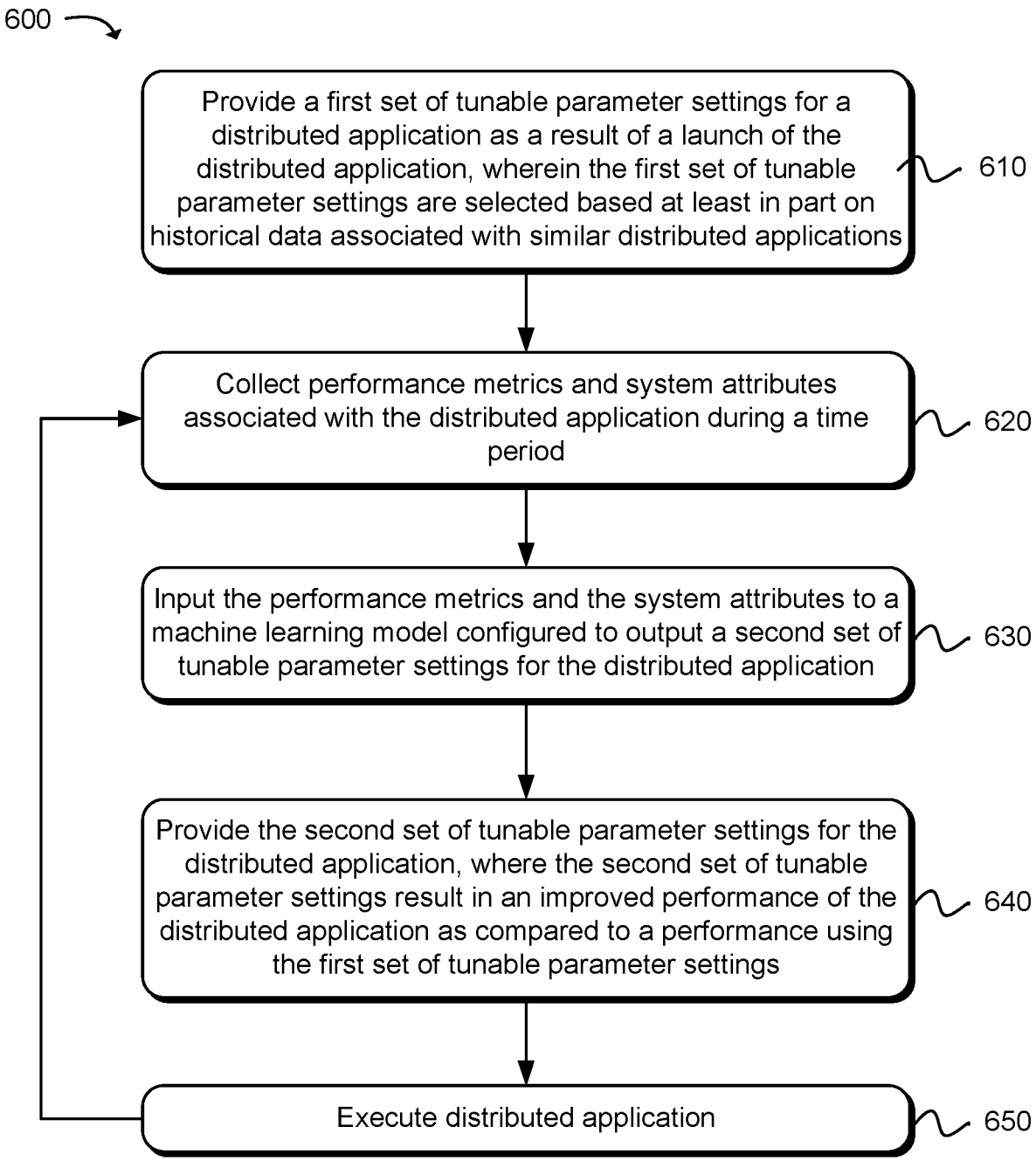
FIG. 6 is a flow diagram illustrating an example method for providing tunable parameter settings for use with a distributed application.

FIG. 6 is a flow diagram that illustrates an example method 600 for providing tunable parameter settings for use with a distributed application. Beginning in block 610, a first set of tunable parameter settings may be provided for a distributed application as a result of a launch of the distributed application. The first set of tunable parameter settings may be selected based at least in part on historical data associated with similar distributed applications. For example, the first set of tunable parameter settings may be selected from a group of historical tunable parameter settings categorized by implementation attributes. A similarity measure may be used to identify historical tunable parameter settings included in the group of historical tunable parameter settings that are associated with distributed application attributes and computing resource attributes that correspond to the distributed application being launched.

The first set of tunable parameter settings may be applied to the distributed application (e.g., a customer may manually set the tunable parameter settings or the tunable parameter settings may be programmatically set) and a data processing task may be performed using the distributed application on behalf of a customer account. As in block 620, performance metrics and implementation attributes associated with the distributed application may be collected during a time period. More specifically, the performance attributes and implementation attributes may be collected during performance of the data processing task.

After collecting the performance attributes and implementation attributes, as in block 630, the performance metrics and the implementation attributes may be input to a machine learning model configured to output a second set of tunable parameter settings for the distributed application. As in block 640, the second set of tunable parameter settings may be provided for use with the distributed application, where the second set of tunable parameter settings may result in an improved performance of the distributed application as compared to a performance using the first set of tunable parameter settings. For example, in response to a request to execute the data processing task using the distributed application on behalf of the customer account, the second set of tunable parameter settings may be generated and provided to a customer, who may then apply the second set of tunable parameter settings to the distributed application and the data processing task may then be performed using the distributed application.

As in block 650, the distributed application may be executed with the second set of performance metrics applied. A feedback loop may collect performance metrics and implementation attributes associated with execution of the distributed application, and the performance metrics and implementation attributes may be used in generating tunable parameter settings for subsequent implementations of the distributed application.

Figure 7:
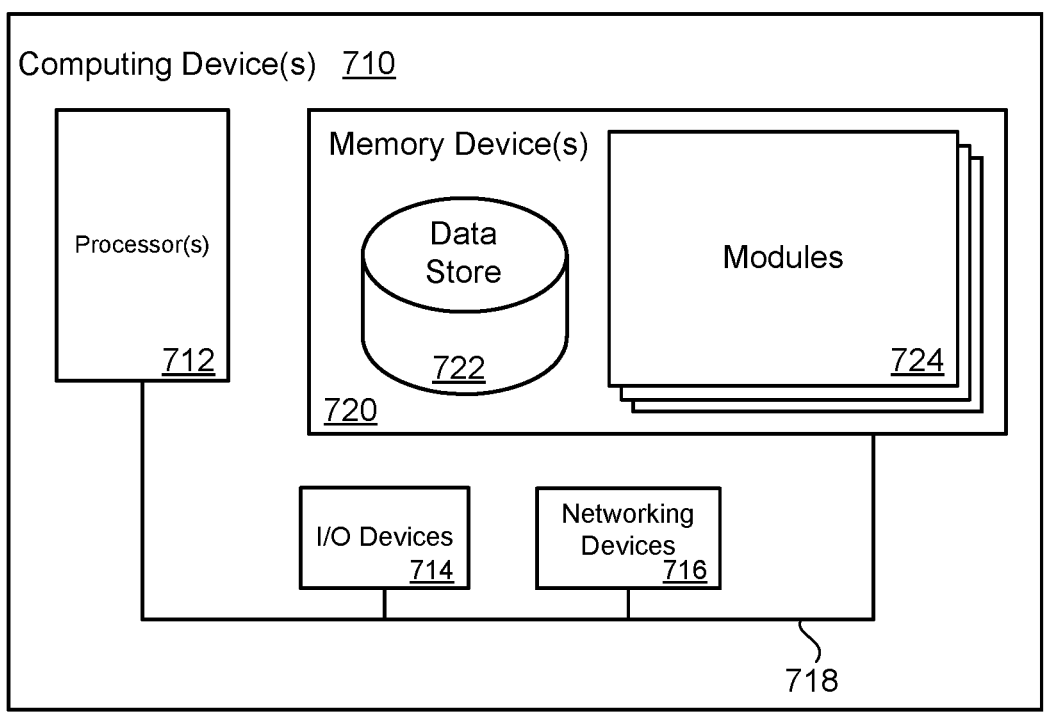
FIG. 7 is a block diagram illustrating an example of a computing device that may be used to execute a method for providing tunable parameter settings for use with a distributed application.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. The modules 724 may include a similarity measure module, a metric collection module, a machine learning module, tunable parameter module, as well as other modules. The modules 724 may be considered a service and may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method, comprising:
   applying one or more first parameter settings to a distributed application, wherein the first parameter settings are chosen using historical data associated with similar distributed applications;
   providing one or more performance metrics of the distributed application to a machine learning model in response to performing the distributed application using the one or more first parameter settings;
   applying one or more second parameter settings of the distributed application based, at least in part, on output of the machine learning model resulting from the one or more performance metrics; and
   performing the distributed application using the one or more second parameter settings.

2. The method as in claim 1, further comprising:
   collecting the one or more performance metrics and implementation attributes associated with a defined implementation of the distributed application; and
   supplying the one or more performance metrics and the implementation attributes to the machine learning model to determine the one or more second parameter settings.

3. The method as in claim 2, wherein the implementation attributes associated with the distributed application include the one or more first parameter settings, distributed application attributes, and computing resource attributes.

4. The method as in claim 3, further comprising performing feature selection for the machine learning model, wherein features are selected from at least one of: the one or more first parameter settings, the distributed application attributes, or the computing resource attributes.

5. The method as in claim 4, further comprising constructing a feature vector for use with the machine learning model using the features selected from at least one of: the one or more first parameter settings, the distributed application attributes, or the computing resource attributes.

6. The method as in claim 1, wherein the one or more first parameter settings are selected based in part on generated parameter settings that are associated with distributed application attributes, computing resource attributes of other distributed applications that are similar to distributed application attributes and computing resource attributes of the distributed application being launched.

7. The method as in claim 1, wherein a customer requesting a launch of the distributed application and a task assigned to the distributed application are identical to the customer and the task associated with the prior instance of the distributed application.

8. The method as in claim 1, further comprising receiving the one or more performance metrics from a software agent included in a computing instance used to execute the distributed application where the software agent is configured to report the one or more performance metrics.

9. The method as in claim 8, further comprising receiving the one or more performance metrics via an Application Programming Interface (API) used by the software agent to write the one or more performance metrics to a distributed application log.

10. The method as in claim 1, wherein the one or more first parameter settings and the one or more second parameter settings for the distributed application are applied automatically to the distributed application.

11. The method as in claim 1, wherein the one or more first parameter settings and the one or more second parameter settings for the distributed application are recommended to a customer.

12. The method as in claim 11, further comprising applying the one or more first parameter settings or the one or more second parameter settings to the distributed application as a result of the customer accepting the recommendation.

13. The method as in claim 1, wherein tunable parameters for the one or more first parameter settings or the one or more second parameter settings applied to the distributed application include at least one of: computer memory size parameters, data structure parameters, data serialization parameters, or memory recovery parameters.

14. A method, comprising:
    identifying a first set of tunable parameter settings for a distributed application as a result of a launch request for the distributed application, using at least one processor, the first set of tunable parameter settings being identified based at least in part on historical data associated with similar distributed applications;
    supplying performance metrics and implementation attributes associated with the distributed application to a machine learning model to generate a second set of tunable parameter settings for the distributed application, using the at least one processor; and
    providing the second set of tunable parameter settings for the distributed application, using the at least one processor, wherein the second set of tunable parameter settings result in an improved performance of the distributed application as compared to a performance using the first set of tunable parameter settings.

15. The method of claim 14, wherein the similar distributed applications are associated with separate customer accounts.

16. The method of claim 14, wherein the implementation attributes include at least one of distributed application attributes or computing resource attributes.

17. A system comprising:
    at least one processor;
    a memory device including instructions that, when executed by the at least one processor, cause the system to:
    generate a first set of tunable parameter settings for a first implementation of a distributed application associated with a customer account using a machine learning model configured to output generated tunable parameter settings for the distributed application, wherein the machine learning model is trained using historical data and features associated with prior implementations of the distributed application associated with other customer accounts; and
    generate a second set of tunable parameter settings for the distributed application after a time period based on input of performance metrics and implementation attributes associated with the distributed application, where the second set of tunable parameter settings result in an improved performance as compared to a performance using the first set of tunable parameter settings.

18. The system as in claim 17, wherein tunable parameter settings that are determined to have a greater impact on a performance of the distributed application as compared to other tunable parameter settings for the distributed application are included in at least one of the first set of tunable parameter settings or the second set of tunable parameter settings.

19. The system as in claim 17, wherein the memory device includes instructions that, when executed by the at least one processor, causes the system to further:
- adjust the first set of tunable parameter settings by randomized increments or heuristics; and
- collect resulting performance metrics during an adjustment time period.

20. The system as in claim 17, wherein the memory device includes instructions that, when executed by the at least one processor, causes the system to further:
- adjust the first set of tunable parameter settings using randomized increments and heuristics; and
- collect resulting performance metrics during an adjustment time period.

* * * * *